(12) United States Patent
Blanton et al.

(10) Patent No.: US 8,529,211 B2
(45) Date of Patent: *Sep. 10, 2013

(54) WIND TURBINE ROTOR BLADE AND AIRFOIL SECTION

(75) Inventors: Jeffrey Todd Blanton, Mt. Ayr, IA (US); Larry Duane Preston, Mt. Ayr, IA (US)

(73) Assignee: Heartland Energy Solutions, LLC, Mt. Ayr, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,385

(22) Filed: Jul. 9, 2012

(65) Prior Publication Data

US 2012/0301310 A1     Nov. 29, 2012

Related U.S. Application Data

(63) Continuation of application No. 12/456,363, filed on Jun. 16, 2009, now Pat. No. 8,241,000.

(51) Int. Cl.
*F03B 3/12*     (2006.01)

(52) U.S. Cl.
USPC ............. 416/223 R; 416/DIG. 5; 416/DIG. 2

(58) Field of Classification Search
USPC .................... 416/223 R, DIG. 2, DIG. 5, 243
See application file for complete search history.

(56) References Cited

U.S. PATENT DOCUMENTS

| 6,068,446 | A | * | 5/2000 | Tangler et al. | ............ 416/223 R |
| 7,883,324 | B2 | * | 2/2011 | Standish et al. | ............ 416/242 |
| 2007/0036657 | A1 | * | 2/2007 | Wobben | ............ 416/223 R |

* cited by examiner

*Primary Examiner* — Dwayne J White
(74) *Attorney, Agent, or Firm* — Camille L. Urban; G. Brian Pingel; David M. Breiner

(57) ABSTRACT

The present invention includes a set of airfoils, U rails and V rails taken together to describe a blade for use with a horizontal axis wind turbine. The blade's design includes a maximum thickness higher than conventional blades employed for the same use thereby providing better load bearing structural characteristics while at the same time maintaining the requisite aerodynamic qualities for similar blades. The blade has a maximum thickness of about 30% and a maximum lift coefficient of about 1.3.

9 Claims, 12 Drawing Sheets

Original Airfoils at Four Stations

| Airfoil | Chord Distribution | | | Reynolds numbers | | | | Blade / Aero | Geometry Data | | | | |
|---|---|---|---|---|---|---|---|---|---|---|---|---|---|
| | r/R | radius | chord | Re @ 5 mph | Re @ 10 mph | Re @ 15 mph | Re @ 20 mph | cl | at t/c max | t/c max | TE thk | TE thk | t/c at TE |
| | % | ft | ft | | | | | | | % | ft | in | |
| SX3041 | 5% | 2.25 | 3.1367 | 43,337 | 86,674 | 130,012 | 173,349 | . | . | . | . | . | . |
| | 15% | 6.75 | 4.1263 | 171,026 | 342,053 | 513,079 | 684,106 | . | . | . | . | . | . |
| | 25% | 11.25 | 6.0594 | 418,585 | 837,171 | 1,255,756 | 1,674,342 | 1.133 | 0.320 | 25% | 0.023 | 0.271 | 0.004402 |
| | 30% | 13.50 | 5.6180 | 465,711 | 931,423 | 1,397,134 | 1,862,846 | 1.116 | 0.320 | | | | |
| SX3044 | 35% | 15.75 | 5.1766 | 500,840 | 1,001,281 | 1,501,921 | 2,002,561 | 1.098 | 0.32 | | | | |
| | 45% | 20.25 | 4.3776 | 544,333 | 1,088,667 | 1,633,000 | 2,177,333 | 1.063 | 0.32 | 19% | | | |
| | 55% | 24.75 | 3.7997 | 577,468 | 1,154,936 | 1,732,403 | 2,309,871 | 1.029 | 0.32 | | | | |
| SX3042 | 65% | 29.25 | 3.3726 | 605,751 | 1,211,503 | 1,817,254 | 2,423,005 | 0.993 | 0.32 | 15% | 0.021 | 0.250 | 0.00685 |
| | 75% | 33.75 | 3.0400 | 630,008 | 1,260,015 | 1,890,023 | 2,520,030 | 0.949 | 0.32 | | | | |
| | 85% | 38.25 | 2.6153 | 614,251 | 1,228,503 | 1,842,754 | 2,457,005 | 0.893 | 0.32 | | | | |
| SX3043 | 95% | 42.75 | 1.7533 | 460,235 | 920,470 | 1,380,705 | 1,840,941 | 0.829 | 0.32 | 11% | 0.021 | 0.250 | 0.01188 |
| | 100% | 45.00 | 1.3222 | 365,361 | 730,723 | 1,096,084 | 1,461,445 | . | . | . | . | . | . |

FIG. 6

Chord and Twist

| r/R | radius | chord | twist |
|---|---|---|---|
| % | ft | ft | deg |
| 5% | 2.25 | 3.1367 | 20.0020 |
| 15% | 6.75 | 4.1263 | 15.0320 |
| 25% | 11.25 | 6.0594 | 9.8239 |
| 35% | 15.75 | 5.1766 | 6.5280 |
| 45% | 20.25 | 4.3776 | 3.6875 |
| 55% | 24.75 | 3.7997 | 1.9084 |
| 65% | 29.25 | 3.3726 | 0.7142 |
| 75% | 33.75 | 3.0400 | 0.0000 |
| 85% | 38.25 | 2.6153 | -0.7434 |
| 95% | 42.75 | 1.7533 | -1.3006 |
| 100% | 45.00 | 1.3222 | -1.5782 |

| Blade pitch | | | |
|---|---|---|---|
| 75% | 3.881 | deg | |

FIG. 6a

FINAL DATA

| Airfoil | Chord Distribution | | | | | Reynolds numbers | | | | Blade / Aero Design Data | Geometry Data | |
|---|---|---|---|---|---|---|---|---|---|---|---|---|
| | r/R | radius | chord | <1.4m | | @ 16 mph | @ 5 mph | @ 10 mph | @15 mph | @ 20 mph | | |
| | % | ft | ft | <4,593 | ft | Re | Re | Re | Re | Re | cl | a | t/c max | % |
| | 5% | 2.25 | 2.0891 | TRUE | | 115,453 | 36,079 | 72,158 | 108,237 | 144,316 | - | - | - |
| | 15% | 6.75 | 3.0787 | TRUE | | 510,421 | 159,506 | 319,013 | 478,519 | 638,026 | - | - | - |
| SX3045-II | 25% | 11.25 | 4.2125 | TRUE | | 1,163,995 | 363,749 | 727,497 | 1,091,246 | 1,454,994 | 1.133 | 0.32 | 30% |
| SX3041-II | 35% | 15.75 | 3.4724 | TRUE | | 1,343,283 | 419,776 | 839,552 | 1,259,328 | 1,679,104 | 1.098 | 0.32 | 25% |
| | 45% | 20.25 | 2.8881 | TRUE | | 1,436,492 | 448,904 | 897,807 | 1,346,711 | 1,795,614 | 1.063 | 0.32 | - |
| SX3044-II* | 55% | 24.75 | 2.4854 | TRUE | | 1,510,879 | 472,150 | 944,299 | 1,416,449 | 1,888,598 | 1.029 | 0.32 | 19% |
| | 65% | 29.25 | 2.1995 | TRUE | | 1,580,170 | 493,803 | 987,606 | 1,481,409 | 1,975,212 | 0.993 | 0.32 | - |
| SX3042-II | 75% | 33.75 | 1.9924 | TRUE | | 1,651,603 | 516,126 | 1,032,252 | 1,548,378 | 2,064,504 | 0.949 | 0.32 | 15% |
| | 85% | 38.25 | 1.7496 | TRUE | | 1,643,766 | 513,677 | 1,027,354 | 1,541,030 | 2,054,707 | 0.917 | 0.32 | - |
| SX3043-II | 95% | 42.75 | 1.2257 | TRUE | | 1,286,963 | 402,176 | 804,352 | 1,206,527 | 1,608,703 | 0.885 | 0.32 | 11% |
| | 100% | 45.00 | 0.9637 | TRUE | | 1,065,125 | 332,852 | 665,703 | 998,555 | 1,331,406 | - | - | - |

FIG. 7

| Spanwise Station | Chord Length | Aerodynamic Twist | Sectional Thickness-to-chord ratio | Trailing edge thickness | | Airfoil | Pitch Axis Offset from the Section Leading Edge | | | |
|---|---|---|---|---|---|---|---|---|---|---|
| | | | | Dimensional | Normalized | | In-plane offset | | Out-of-Plane | |
| | | | | | | | Dimensional | Normalized | | |
| $z$ [mm] | $c$ [mm] | $\theta$ [°] | $t/c$ [-] | $t_{TE}$ [mm] | $t_{TE}/c$ [-] | | $y_p$ [mm] | $y_p/c$ [-] | $x_p$ [mm] | |
| 0 | 610 | | 100.0% | n/a | n/a | cylinder | 305.0 | 50.00% | 0.0 | |
| 250 | 610 | | 100.0% | n/a | n/a | cylinder | 305.0 | 50.00% | 0.0 | |
| 2750 | 1283 | 12.09 | 30.0% | 6.43 | 0.50% | SX3045-II | 377.5 | 29.42% | -4.5 | |
| 4000 | 1121 | 7.28 | 25.0% | 6.37 | 0.57% | SX3041-II | 336.3 | 30.00% | 4.0 | |
| 7750 | 694 | 2.88 | 19.0% | 3.16 | 0.46% | SX3044-II | 246.9 | 35.59% | 21.0 | |
| 10000 | 584 | 2.04 | 15.0% | 2.00 | 0.34% | SX3042-II | 225.3 | 38.56% | 19.6 | |
| 12500 | 325 | 1.18 | 11.0% | 1.69 | 0.52% | SX3043-II | 125.5 | 38.62% | 12.1 | |
| 12750 | 215 | 1.46 | 11.0% | 1.12 | 0.52% | SX3043-II | 83.0 | 38.62% | 8.0 | |
| 13000 | 20 | 4.21 | 11.0% | 0.10 | 0.52% | SX3043-II | 7.7 | 38.62% | 0.7 | |

\* Not explicitly defined for intermediate stations; values result from definition of these intermediate cross sections \*\* Defined by an iterative process of lofting; adjustment of the lofted surface cross-sections, and relofting, etc.

FIG. 8

| Spanwise Station | Chord Length | Aerodynamic Twist | Thickness-to-chord ratio | Trailing edge thickness | | Airfoil | Pitch Axis Offset from the Section Leading Edge | | | Out-of-Plane |
| | | | | Dimensional | Normalized | | In-plane offset | | | |
| | | | | | | | Dimensional | Normalized | | |
| z [mm] | C [mm] | θ [°] | t/c [-] | $t_{TE}$ [mm] | $t_{TE}/c$ [-] | | $y_P$ [mm] | $y_P/c$ [-] | | $x_P$ [mm] |
|---|---|---|---|---|---|---|---|---|---|---|
| 250 | 610 | * | 100.0% | n/a | n/a | cylinder | 305.0 | 50.00% | | 0.0 |
| 750 | 665 | * | * | * | * | * | * | * | | * |
| 1250 | 800 | * | * | 4.06 | | * | * | * | | * |
| 1750 | 1010 | 15.73 | * | 6.36 | | * | * | * | | * |
| 2250 | 1205 | 12.50 | * | 6.27 | | * | * | * | | * |
| 2750 | 1283 | 12.09 | 30.0% | 6.43 | 0.50% | SX3045-II | 377.5 | 29.42% | | -4.5 |
| 3250 | 1250 | 10.19 | * | 6.77 | | * | * | * | | * |
| 4000 | 1121 | 7.28 | 25.0% | 6.37 | 0.57% | SX3041-II | 336.3 | 30.00% | | 4.0 |
| 4750 | 998 | 5.71 | * | 5.43 | | * | * | * | | * |
| 5500 | 894 | 4.76 | * | 4.67 | | * | * | * | | * |
| 6250 | 809 | 4.01 | * | 4.07 | | * | * | * | | * |
| 7000 | 744 | 3.37 | * | 3.59 | | * | * | * | | * |
| 7750 | 694 | 2.88 | 19.0% | 3.16 | 0.46% | SX3044-II | 246.9 | 35.59% | | 21.0 |
| 8500 | 654 | 2.53 | * | 2.72 | | * | * | * | | * |
| 9250 | 620 | 2.29 | * | 2.33 | | * | * | * | | * |
| 10000 | 584 | 2.04 | 15.0% | 2.00 | 0.34% | SX3042-II | 225.3 | 38.56% | | 19.6 |
| 10750 | 543 | 1.72 | * | 2.04 | | * | * | * | | * |
| 11500 | 485 | 1.44 | * | 2.06 | | * | * | * | | * |
| 12250 | 385 | 1.24 | * | 1.94 | | * | * | * | | * |
| 12500 | 325 | 1.18 | 11.0% | 1.69 | 0.52% | SX3043-II | 125.5 | 38.62% | | 12.1 |
| 12750 | 215 | 1.46 | 11.0% | 1.12 | 0.52% | SX3043-II | 83.0 | 38.62% | | 8.0 |
| 13000 | 20 | 4.21 | 11.0% | 0.10 | 0.52% | SX3043-II | 7.7 | 38.62% | | 0.7 |

\* Not explicitly defined for intermediate stations; values result from definition of the intermediate cross sections

FIG. 9

| Spanwise Station | Spanwise Rails | | | | | | | | | |
|---|---|---|---|---|---|---|---|---|---|---|
| | $x_{y=-200}$ [mm] | | $x_{y=-100}$ [mm] | | $x_{y=0}$ [mm] | | $x_{y=100}$ [mm] | | $x_{y=200}$ [mm] | |
| z [mm] | Pressure Surface | Suction Surface | Pressure Surface | Suction Surface | Pressure Surface | Suction Surface | Pressure Surface | Suction Surface | Pressure Surface | Suction Surface |
| 250 | -230.27 | 230.27 | 288.14 | 288.14 | 305.00 | 305.00 | 288.14 | 288.14 | 230.27 | 230.27 |
| 750 | -226.50 | 226.00 | -284.00 | 281.00 | -293.00 | 296.90 | -279.00 | 283.20 | -224.50 | 230.27 |
| 1250 | -218.00 | 215.80 | -268.00 | 264.60 | -268.00 | 279.80 | -258.00 | 271.80 | -211.00 | 229.80 |
| 1750 | -205.00 | 199.60 | -240.00 | 240.20 | -238.50 | 256.00 | -226.00 | 254.50 | -190.00 | 228.00 |
| 2250 | -187.70 | 177.50 | -212.00 | 210.50 | -211.20 | 228.01 | -197.00 | 231.50 | -166.80 | 219.50 |
| 2750 | -167.22 | 153.66 | 187.33 | 183.21 | 187.36 | 198.65 | 172.74 | 203.15 | 147.07 | 197.90 |
| 3250 | -146.60 | 134.50 | -166.20 | 160.00 | -167.00 | 171.20 | -153.20 | 171.50 | -131.00 | 163.50 |
| 4000 | -118.04 | 114.36 | 140.61 | 132.83 | 142.00 | 137.22 | 130.82 | 131.46 | 113.27 | 117.70 |
| 4750 | -92.70 | 96.57 | -117.20 | 112.50 | -121.10 | 113.00 | -114.40 | 100.50 | -102.00 | 81.00 |
| 5500 | -70.60 | 81.15 | -95.80 | 97.10 | -103.10 | 96.50 | -101.90 | 78.50 | -94.50 | 53.80 |
| 6250 | -51.65 | 68.10 | -77.20 | 85.30 | -88.00 | 84.80 | -92.20 | 64.20 | -89.00 | 35.80 |
| 7000 | -35.85 | 57.50 | -61.80 | 76.20 | -76.00 | 75.30 | -84.20 | 55.90 | -83.50 | 25.50 |
| 7750 | -23.41 | 49.28 | -49.92 | 68.73 | -66.46 | 66.46 | -76.71 | 47.43 | -77.81 | 16.22 |
| 8500 | -14.50 | 43.00 | -41.50 | 62.10 | -58.30 | 58.30 | -69.80 | 38.85 | -71.90 | 6.90 |
| 9250 | -9.00 | 38.00 | -35.00 | 56.10 | -50.90 | 50.90 | -61.90 | 30.20 | -65.70 | -2.50 |
| 10000 | -6.13 | 33.54 | -29.36 | 50.38 | -44.16 | 44.16 | -54.79 | 21.52 | -59.43 | -11.82 |
| 10750 | | | -23.70 | 44.40 | -37.60 | 37.60 | -48.10 | 12.90 | -54.00 | -20.90 |
| 11500 | | | -17.00 | 37.00 | -30.60 | 30.60 | -41.80 | 5.00 | -49.70 | -29.70 |
| 12250 | | | -7.58 | 26.07 | -21.96 | 21.96 | -34.80 | -3.29 | -46.62 | -37.83 |
| 12500 | | | -3.15 | 19.53 | -17.98 | 17.98 | -31.01 | -8.43 | | |
| 12750 | | | | | -11.89 | 11.89 | -24.20 | -16.77 | | |
| 13000 | | | | | -1.10 | 1.10 | | | | |

Mold Orientation; blade rotated 10° nose up about pitch axis; mold split line rails and the spanwise rails defined in the Mold Orientation

FIG. 10

| Spanwise Station | Forward and Aft Rails | | | | | |
|---|---|---|---|---|---|---|
| | Forward Parting Line | | Trailing Edge Suction Surface | | Trailing Edge Pressure Surface | |
| z | y | x | Y | x | Y | x |
| [mm] | [mm] | [mm] | [mm] | [mm] | [mm] | [mm] |
| 0 | -305.00 | 0.00 | 305.00 | 0.00 | 305.00 | 0.00 |
| 250 | -305.00 | 0.00 | 305.00 | 0.00 | 305.00 | 0.00 |
| 750 | -308.00 | 0.00 | 351.91 | 2.00 | 351.91 | 0.00 |
| 1250 | -318.81 | 0.00 | 473.06 | 7.00 | 473.06 | 2.00 |
| 1750 | -340.10 | 0.00 | 666.17 | 16.05 | 666.17 | 9.95 |
| 2250 | -364.06 | 0.00 | 839.93 | 29.20 | 839.93 | 22.80 |
| 2750 | -376.06 | 0.01 | 905.71 | 40.60 | 905.71 | 34.17 |
| 4000 | -336.63 | 11.02 | 783.11 | -38.05 | 783.11 | -44.42 |
| 4750 | -308.63 | 11.00 | 686.78 | -60.10 | 686.78 | -65.90 |
| 6250 | -268.75 | 11.00 | 536.42 | -72.79 | 536.42 | -77.21 |
| 7000 | -256.67 | 11.00 | 482.32 | -74.62 | 482.32 | -78.39 |
| 7750 | -248.64 | 10.99 | 439.84 | -74.48 | 439.84 | -77.64 |
| 8500 | -242.14 | 11.00 | 406.79 | -73.20 | 406.79 | -75.80 |
| 9250 | -235.55 | 11.00 | 378.63 | -70.93 | 378.63 | -73.08 |
| 10000 | -226.47 | 11.03 | 352.19 | -67.96 | 352.19 | -69.96 |
| 10750 | -210.79 | 11.00 | 326.82 | -64.00 | 326.82 | -66.00 |
| 11500 | -188.19 | 10.50 | 291.56 | -58.00 | 291.56 | -60.00 |
| 12250 | -149.42 | 8.59 | 231.09 | -49.00 | 231.09 | -50.94 |
| 12500 | -126.12 | 7.29 | 195.04 | -41.67 | 195.04 | -43.36 |
| 12750 | -83.50 | 4.43 | 129.11 | -26.93 | 129.11 | -28.05 |
| 13000 | -7.81 | 0.05 | 12.08 | -1.92 | 12.08 | -2.02 |

FIG. 11

WIND TURBINE ROTOR BLADE AND AIRFOIL SECTION

CROSS-REFERENCE TO RELATED APPLICATIONS

The present application is a continuation of U.S. patent application Ser. No. 12/456,363, filed Jun. 16, 2009 now U.S. Pat. No. 8,241,000.

FIELD OF INVENTION

The present invention relates in general to rotor blades for wind turbines wherein the blade of the present invention comprises an airfoil that, in combination with designed airfoils at other stations, provides better load bearing structural characteristics than the generally acceptable blades. The blade is characterized by a family of airfoils distributed at spanwise stations at about 25%, 35%, 55%, 75% and 95% in the mid-span region and tip region. Specifically, the blade so described has a mid-span airfoil exhibiting a thickness of about 30%, a Reynolds number in the range of about $1.1 \times 10^6$ to $1.3 \times 10^6$ and a maximum lift coefficient of about 1.3.

BACKGROUND

Wind turbines operate at either a constant rotational speed or at variable rotational speeds that are proportional to the wind velocity. Peak power at high wind speeds is usually controlled through stall regulation or through the use of variable pitch turbine blades. A conventional horizontal axis wind turbine (HAWT) employed to generate electric power typically includes two or more turbine blades each associated with a central hub. The hub rotates about an axis and is connected to a shaft. Conversion of wind power into electrical power is accomplished in most wind powered systems by connecting the shaft to drive an electric generator.

The point of the turbine blade closest to the hub is called the root of the blade, while the point of the turbine blade farthest from the hub is called the tip of the blade. The portion therebetween is the mid-span. A line connecting root to tip is referred to as the span of the blade. A cross-section of a turbine blade taken perpendicular to the span is generally referred to as an airfoil. Theoretically, therefore, each turbine blade includes an infinite number of airfoils along that line and it is the collection of airfoils that fully describes the blade's contours and shape. Typically, however, a blade's shape is defined in reference to a finite number of the airfoil shapes for convenience. Further, once the airfoils are determined, it is the accepted practice that at least some portion of the blade is further designed by application of a computer program that interpolates between the fixed airfoils to create foils therebetween.

Blade design starts with airfoil shapes. Next, computer programs have been employed to complete the design of the blades. However, employing these programs has created problems with wind turbines. Allowing a CAD program to loft the blade surface for airfoil sections which have been arbitrarily placed for optimal aerodynamics may result in waves or ripples in the surface loft that can be deleterious to structural integrity. This occurs when the CAD Program forces a surface through the pre-defined airfoil section. In addition, the thickness of blades designed using CAD programs are often kept artificially low in order to minimize the computer program's negative effects on the curvatures between fixed airfoil stations. However, keeping the thickness low often results in blades that may not be able to bear the loads required; these blades may buckle. On the other hand, incorrectly assigned airfoil coordinates for thicker blades can result in less than desirable aerodynamic properties in some portions of the blade. Therefore, many blades used in wind turbines often sacrifice structural soundness and dependability in exchange for more aerodynamic attributes. Since the primary goal of a wind turbine is to convert the kinetic energy of the wind into electrical energy as inexpensively and efficiently as possible, operational efficiency of the wind turbine is negatively affected by a structure that can allow the blade to buckle under certain loads. The blade design of the present invention addresses these problems without the corresponding expected loss in aerodynamic character.

SUMMARY OF THE INVENTION

A wind turbine rotor blade and airfoil family is provided. The blade includes a root end, an opposite tip end, a leading edge and a trailing edge, each extending from root end to tip end. The airfoil also includes an upper surface and a lower surface. Chord perpendicular to the span (from root to tip) lies in the plane extending through the leading edge and trailing edge. Thickness is in the direction perpendicular to chord and to span and is typically expressed as the ratio of its measure to the measure of the chord at that spanwise station and termed "thickness". Thickness is the distance between the upper surface and the lower surface.

The geometric shape of an airfoil is usually expressed in tabular form in which the x, y coordinates of both the upper and lower surfaces of the airfoil at a given cross-section of the blade are measured with respect to the chord line, which is the imaginary line connecting the leading edge of the airfoil and the trailing edge of the airfoil. Both x and y coordinates are expressed as fractions of the chord length. As previously alluded to, another important parameter of an airfoil is its thickness. The thickness of an airfoil refers to the maximum distance between the airfoil's upper surface and the airfoil's lower surface and is generally provided as a fraction of the airfoil's chord length. For example, a five percent thick airfoil has a maximum thickness (i.e., a maximum distance between the airfoil's upper surface and the airfoil's lower surface) that is five percent of the airfoil's chord length.

Similar to the description of the geometric shape of the airfoil, the exact placement of the airfoil relative to the pitch axis is defined by offsets $x_P$ and $y_P$ oriented with respect to fine pitch i.e. the pitch as oriented at below rated wind speeds. Where the suction surface is nominally downwind at fine pitch so x is downwind and y is orthogonal in the plane of rotation roughly towards the trailing edge.

The chord length of an airfoil or cross-section of a turbine blade will typically become larger if the length of the blade increases and will typically become smaller if the length of the blade becomes smaller.

Another important parameter for every airfoil or blade cross-section is its operating Reynolds number. Airfoil performance characteristics are expressed as a function of the airfoil's Reynolds number. As the length of a blade decreases, the blade's Reynolds number tends to decrease. For a particular airfoil along the blade's span, a small Reynolds number indicates that viscous forces predominate while a large Reynolds number indicates that inertial forces predominate.

In the present invention the cross-sections or airfoils are designed to work at relatively low Reynolds numbers (between about $1.15 \times 10^6$ and $1.3 \times 10^6$) and the maximum thickness has been preserved at about 30%. The cross-sections have been maintained aerodynamically sound therefore providing a blade that tolerates the high loads demanded at the maximum chord section of the blade while improving the overall performance of the blade without sacrificing nearly the performance that is sacrificed if less than adequate cross sections are employed.

Most blade designs are accomplished by first establishing parameters for several cross sections of the blade spaced out along the blade between its root and tip and then employing CAD to provide the parameters for cross sections therebetween. For turbines operating at Reynolds numbers such as those mentioned above, the thickness of the aerodynamically designed portion of a blade is typically no more than 25% because when the thickness exceeds 25% the cross sections are generally less than aerodynamically sound. It is widely accepted that aerodynamically sound cross sections are required to maximize the blade's utility and power performance. Therefore, a thickness above about 25% is not employed for wind turbine blades of the 10-16 meter variety. However, the resulting relatively thin blades do not adequately tolerate high loads and are less structurally sound. This disadvantage is typically accepted in the art as better than the alternative of cross sections that are not aerodynamically sound.

On the other hand, if a 30% maximum thickness blade including an airfoil for operation at Reynolds numbers between about 1.1 and $1.3 \times 10^6$ is created instead by careful design and paying careful attention to the effects of slight changes in chord length and twist on curvature, then the strength of the blade can be increased without the same level of damage to the aerodynamic properties of the blade. This is the advantage offered by the present invention. The present invention, therefore, stands counter to the industry standard, having a 30% maximum thickness yet still exhibiting aerodynamically acceptable cross sections for performance.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIGS. 6 and 6a are tables showing design statistics applying to the four original airfoils;

FIG. 7 is a table showing certain design statistics of the five airfoils of the final design;

FIG. 8 is a table showing design statistics and pitch axis offset of the five airfoils of the final design;

FIG. 9 is a table showing design statistics and pitch axis offset of the five airfoils of the final design and other airfoils therebetween;

FIG. 10 is a table providing the coordinates of the Spanwise (V) rails of the present invention; and FIG. 11 is a table providing coordinates of the Spanwise (V) rails and two additional V rails at the forward part line and the surfaces at the trailing edge.

DETAILED DESCRIPTION OF THE PREFERRED EMBODIMENT

Figure 1:
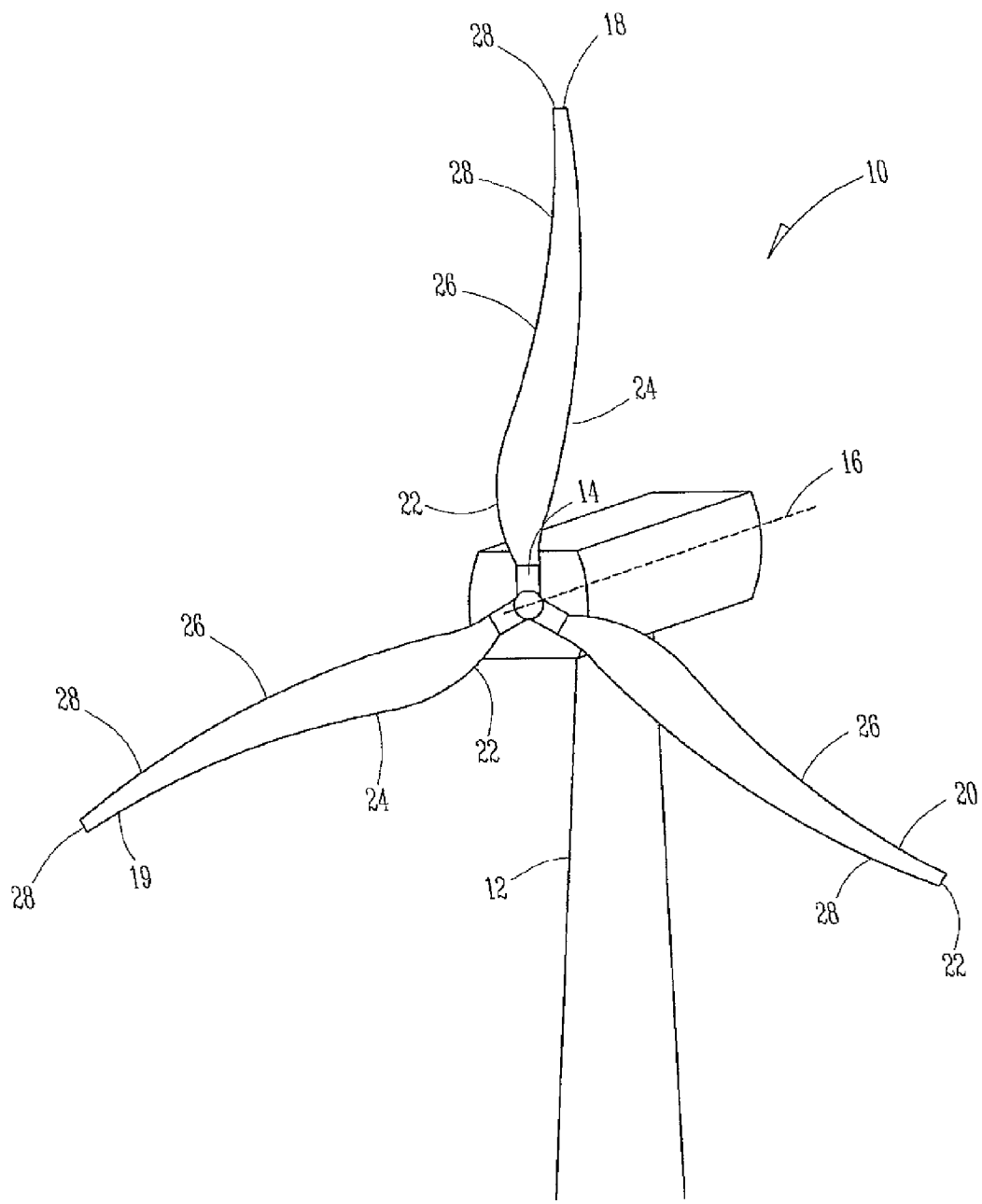
FIG. 1 is a perspective view of a wind turbine embodying the present invention.
Figure 2:
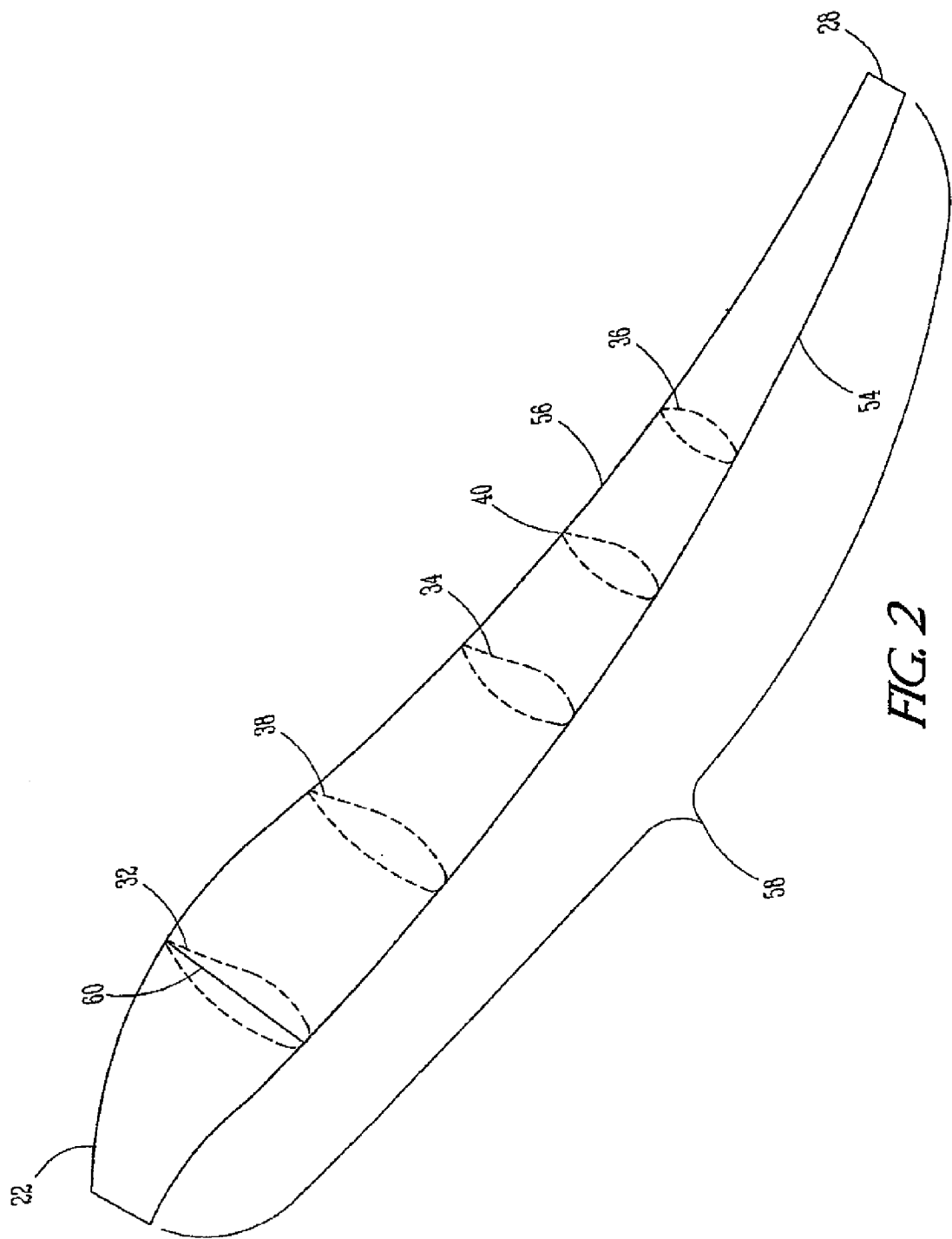
FIG. 2 is a perspective view of a blade of the wind turbine.
Figure 2A:
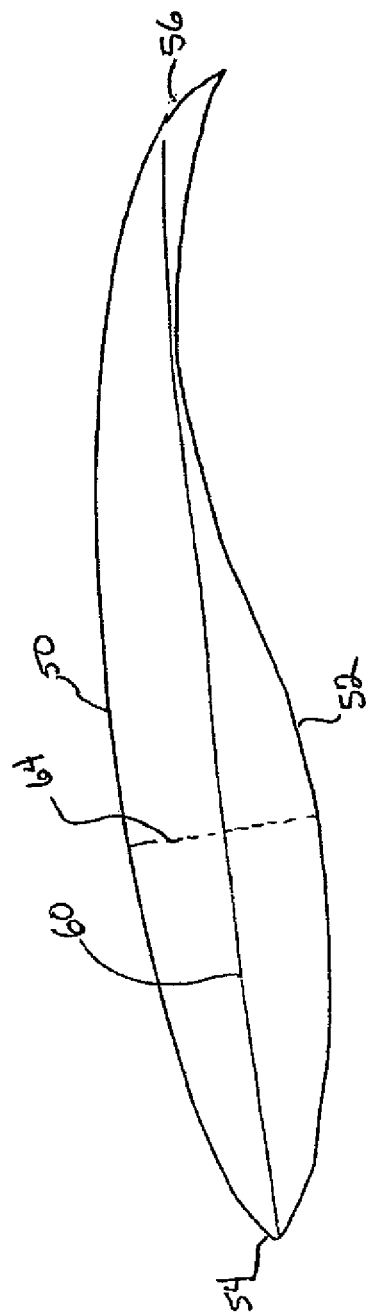
FIG. 2a is an end view of an airfoil of the present invention.
Figure 3:
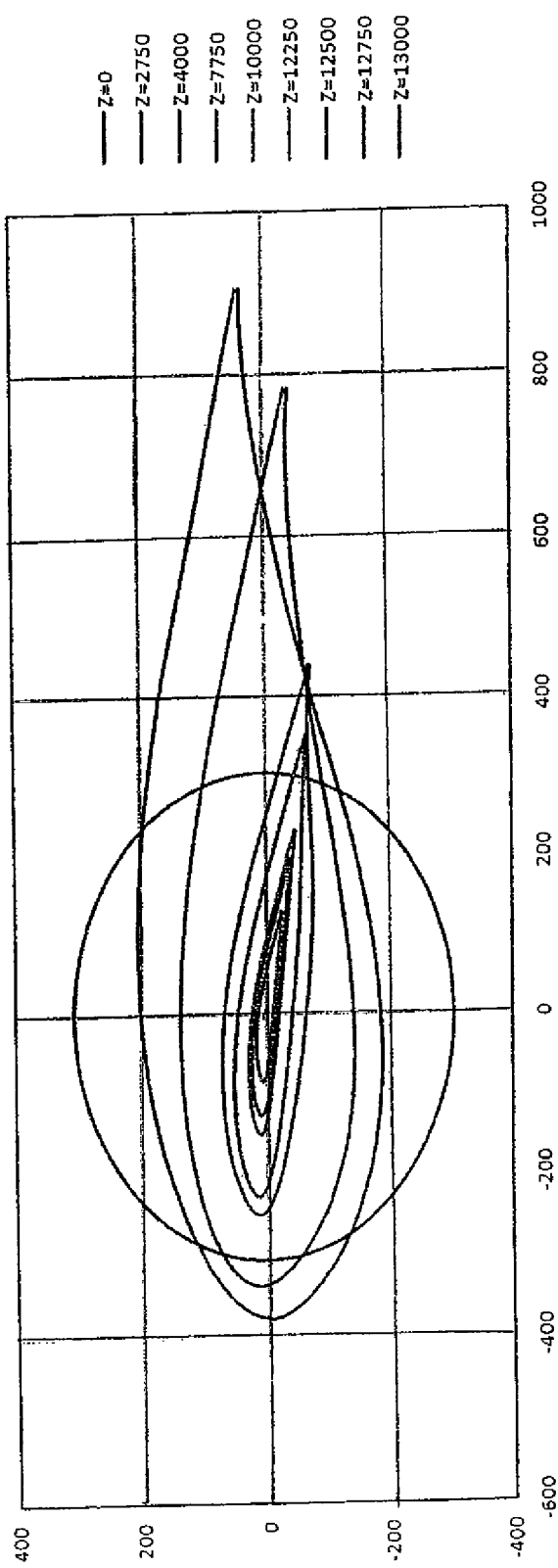
FIG. 3 is a cross section showing a family of airfoils belonging to the blade of the present invention.
Figure 4:
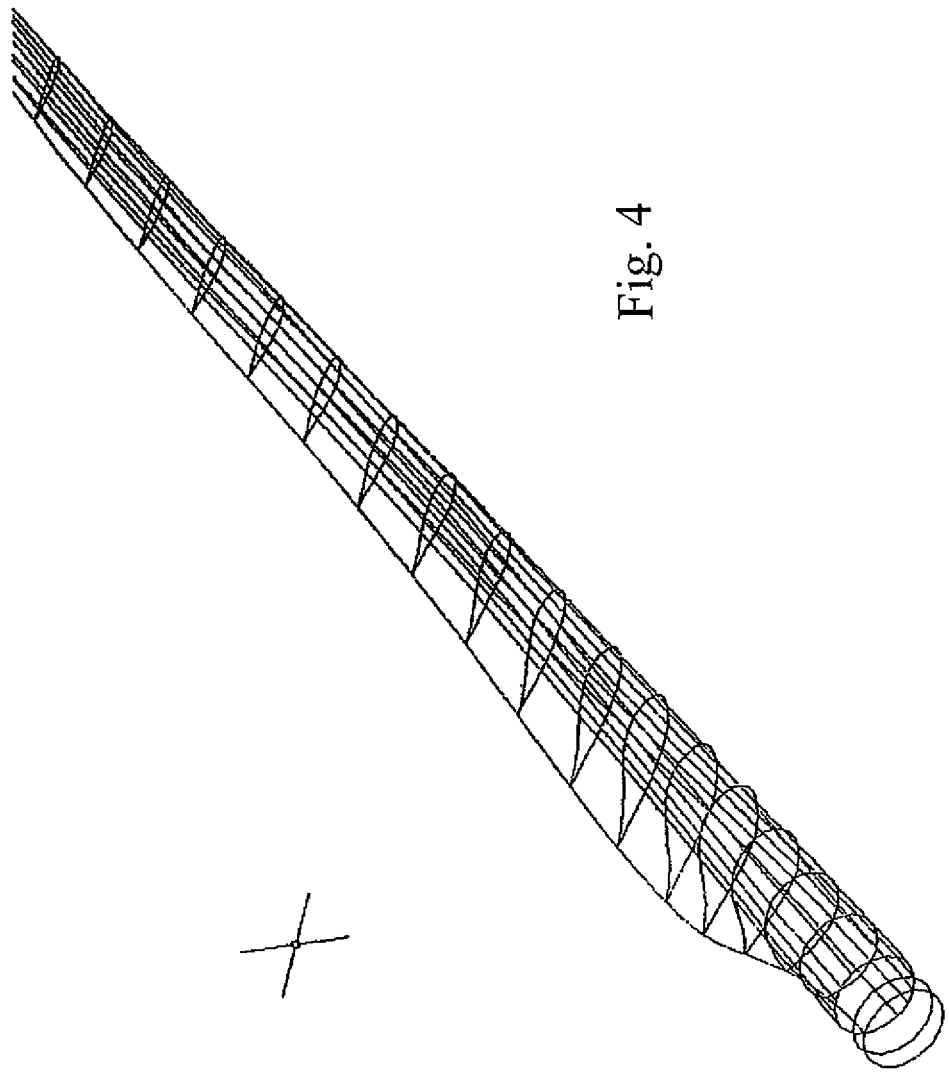
FIG. 4 is an oblique view of the cross sections and v rails of the blade of the present invention.

A horizontal axis wind turbine 10 having a tower 12, a hub 14, a horizontal axis 16, and a plurality of blades 18, 19 and 20 each having a root 22, a root region 24, mid-span region 26, a tip 28, and a tip 30 region each comprising at least one airfoil 32, 34, 36, 38 and 40 of the present invention is presented in FIG. 1. As also shown in FIGS. 2 and 2a, each of said plurality of blades 18, 19 and 20 further comprises an upper surface 50, a lower surface 52, the airfoils 32-40, a leading edge 54, a trailing edge 56, and a span 58 extending from root 22 to tip 28 and is further numerically characterized by a tip speed ratio. Each of said at least one airfoil 32, 34, 36, 38 and 40 comprises a chord 60 which is the distance between the leading edge 54 and the trailing edge 56, a thickness 64 perpendicular to the chordline 60 extending between the upper surface 50 and the lower surface 52 and expressed as a percentage of the chord 60, and a maximum lift coefficient and a design Reynolds number pertaining to each of said airfoils. These numeric values are shown in FIG. 7. Lift of the entire blade can be described by integrating the lift of all the airfoils in the blade and depends on the velocity of the air flow on the airfoil, the shape and contour of the airfoil, and the airfoil's angle of attach which is the angle between the chord and the vector resulting from all the combined air forces on the blade i.e. wind speed vector, airfoil's rotational velocity vector, and blade induced velocity vectors.

The root and transition region 24 extends outwardly from the horizontal axis 16 to a point approximately 20% of the distance between the axis 16 and the tip 28; the tip region 30 from the tip 28 back to the point approximately 90% of the distance from axis 16 to tip 28; and the mid-span region 26 covers the region between the tip region 30 and the root region 24.

The blade design of the present invention started with defining four airfoils 32, 34, 36, 38 (See FIG. 6) and later adding a fifth airfoil 40 at five stations along the blade (see FIG. 7), and adding the barrel root 22. The exact placement of each airfoil at its station relative to the pitch axis of the blade is defined by the offsets $x_P$ and $y_P$. (See FIG. 8). The values of $x_P$ and $y_P$ for the stations are chosen to produce minimal curvature along spanwise cross-sections taken at Y=-200, -100, 0, 100 and 200 (Refer to FIGS. 9 and 10). Traditionally, lofting includes using a CAD program to design the blade between the stations. Sometimes, the system designs a region of very high concave curvature which increases the tendency for the blade surface to buckle under a load. Buckling resistance can be improved by minimizing this curvature.

Figure 5:
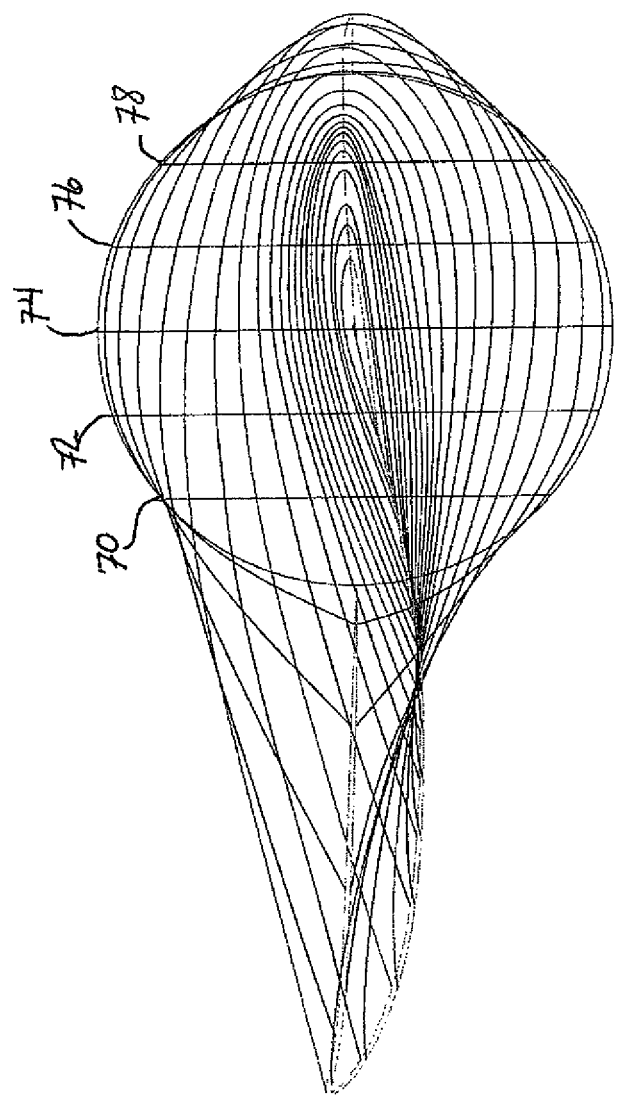
FIG. 5 is an end view of FIG. 4.

As shown in FIGS. 5 and 10 spanwise cross-sections 70-80 called V rails were taken into account to help define the blade curvature in the spanwise direction. The relative positions of the spanwise cross-sections 70-80 are indicated as positions on a y coordinate, where y=0 is taken with the blade rotated 10 degrees nose up relative to the fine pitch orientation. The ability of the airfoils 32, 34, 36, 38 and 40 encompassed by each blade 18, 19 or 20 in the present invention to withstand buckling tendencies is attributed to the maximum thickness 64 embodied in the airfoil 40 encompassed by the blade 18, 19 or 20. The ability of the blade 18, 19, or 20 comprising this airfoil 40 to exhibit acceptable performance parameters can be attributed to the additional airfoils 32, 34, 36, and 38 designed at selected stations. These additional airfoils function as U rails. These U rails and the V rails running from root 22 to tip 28 intersect.

In order to best maintain aerodynamic function of the blade while obtaining the structural advantage of the maximum thickness of 30%, the contours of the V rails were modified to reduce their curvature. These modifications took the form of slight alterations of twist and chord length of airfoils between the U rails all while maintaining the original intersections of the U and V rails. Differences before and after modifications are presented in FIGS. 6a and 7.

Slight shifting of one station by $x_P$ or $y_P$ (relative to fine pitch) may reduce the curvature in one spanwise cross-section and increase it in another. Therefore, a balance was struck by shifting slightly the placement of the stations. In the blade 18, 19 and 20 of the present invention, the spanwise rails placed at Y=−100, 0, and 100 are the most critical with regard to curvature. Therefore, the variables $x_P$, $y_P$, twist and chord length were taken into account and manipulated to create smooth sections between the established stations. For each of the original five airfoils and for several airfoils therebetween, $x_P$, $y_P$, chord length and twist were optimized to increase buckling resistance while retaining the intersections of the V rails with the original five airfoils. The optimized five stations are described by FIGS. 8 and 9. Upon correct manipulation, the resulting blade exhibited enhanced buckling resistance and load tolerance while maintaining aerodynamically acceptable cross-sections. While a 30% thickness blade will never perform as well as a 25% thickness at these Reynolds numbers, it will perform far better and exhibit load tolerances much improved over prior art blades at about and below 25% thickness.

In FIG. 9, stations and relevant airfoils located between the optimized five stations are also presented. These airfoils fully describe the shape of a wind turbine blade with tip speed ratio of 7.5 which exhibits higher buckling resistance than comparable prior art blades.

Thus, the present invention has been described in an illustrative manner. It is to be understood that the terminology that has been used is intended to be in the nature of words of description rather than of limitation.

Many modifications and variations of the present invention are possible in light of the above teachings. For example, the blade length can vary within the range, the maximum thickness may be larger than 30%, the number of airfoils selected as the base set may be higher or lower. Therefore, within the scope of the appended claims, the present invention may be practiced otherwise than as specifically described.

We claim:

1. An airfoil comprising a leading edge and a trailing edge; an upper surface and a lower surface; a maximum thickness of about 30%; and a maximum lift coefficient of about 1.133.

2. The airfoil of claim 1 further comprising a Reynold's number of about $1.2 \times 10^6$.

3. A plurality of airfoils comprising a first airfoil comprising a maximum thickness of about 30%, a Reynolds number in a first range, a spanwise position of about 25% from root, and a maximum lift coefficient of about 1.13; a second airfoil comprising a maximum thickness of about 25%, a Reynold's number in a second range which overlaps the first range but exceeds the upper value of said first range and a maximum lift coefficient of about 1.10; a third airfoil comprising a maximum thickness of about 19%, a Reynold's number in a third range which overlaps with the second range but exceeds the upper value of the second range and a maximum lift coefficient of about 1.0; a fourth airfoil comprising a maximum thickness of about 15%, a Reynold's number in a fourth range which overlaps with the third range but exceeds the upper value of the third range and a maximum lift coefficient of about 1.0; and a fifth airfoil comprising a maximum thickness of about 11%, a Reynolds' number in a fifth range which overlaps with the fourth range but exceeds the upper value of the fourth range and a maximum lift coefficient of about 0.9.

4. A plurality of airfoils comprising a first airfoil comprising a maximum thickness of about 30%, a spanwise position of about 25% from root, and a maximum lift coefficient of about 1.13; a second airfoil comprising a maximum thickness of about 25%, and a maximum lift coefficient of about 1.10; a third airfoil comprising a maximum thickness of about 19%, and a maximum lift coefficient of about 1.0 ; a fourth airfoil comprising a maximum thickness of about 15%, and a maximum lift coefficient of about 1.0; and a fifth airfoil comprising a maximum thickness of about 11%, and a maximum lift coefficient of about 0.9.

5. A wind turbine having at least one blade associated with a hub and a horizontally rotatable shaft said blade comprising a length between about 10 meters and 16 meters, a leading edge, a trailing edge, an upper surface, a lower surface, a root, and at least one airfoil said airfoil comprising a maximum thickness of about 30% and a lift coefficient of about 1.1.

6. The wind turbine of claim 5 wherein said at least one airfoil further comprises a twist and a chord of about 1.28 meters.

7. The wind turbine of claim 5 wherein said turbine is a variable speed turbine with a power maximum of about 120 kW and a tip speed ratio of 7.5.

8. The wind turbine of claim 6 wherein said blade further comprises a second airfoil positioned a first distance from said root, a third airfoil positioned a second distance from said root said second distance further than said first distance, a fourth airfoil positioned a third distance from said root said third distance further than said second distance, and a fifth airfoil positioned at about 95% of said span from said root, wherein said at least one airfoil comprises a chord of about 1.28 meters and twist of about 12 degrees.

9. The wind turbine of claim 8 wherein said second airfoil comprises a maximum thickness of about 25%, a chord of about 1.12 meters and a twist of about 7.2 degrees; said third airfoil comprises a maximum thickness of about 19%, a chord of about 0.69 meters and a twist of about 2.8 degrees; and said fourth airfoil comprising a maximum thickness of about 15%, a chord of about 0.58 meters and a twist of about 2.0 degrees.

\* \* \* \* \*